April 13, 1954 W. W. PORTER 2,674,838
ADJUSTABLE VINE HARVESTING DEVICE
Filed July 25, 1950 4 Sheets-Sheet 3
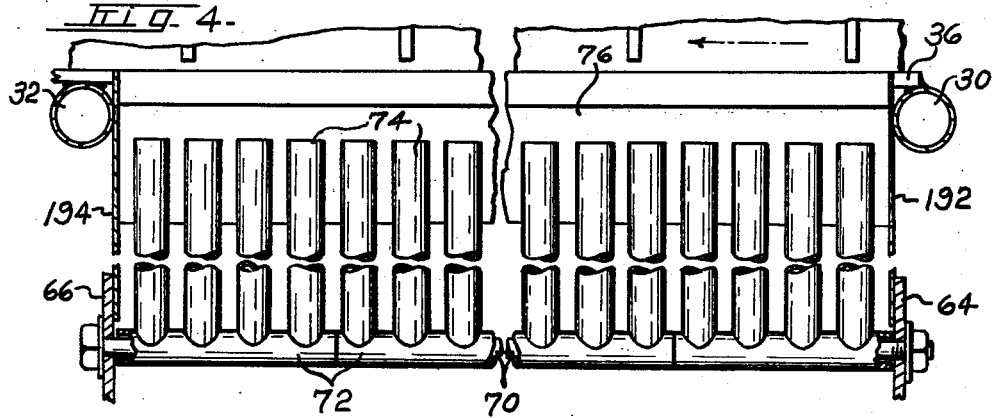
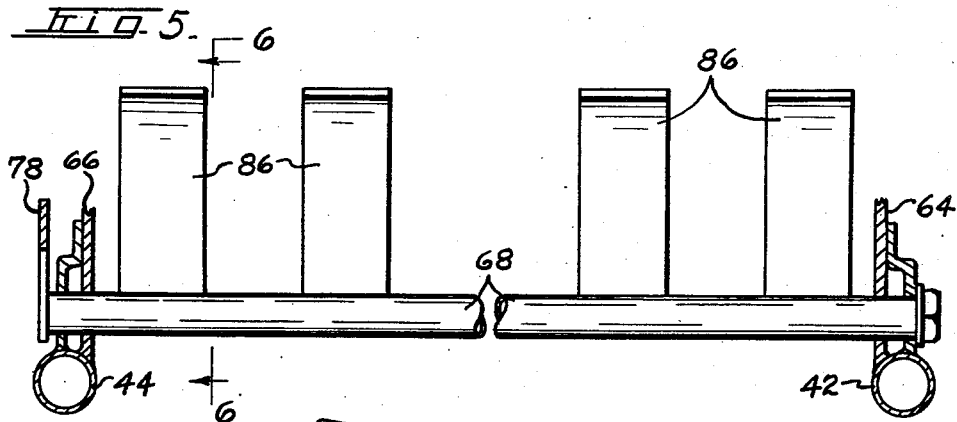
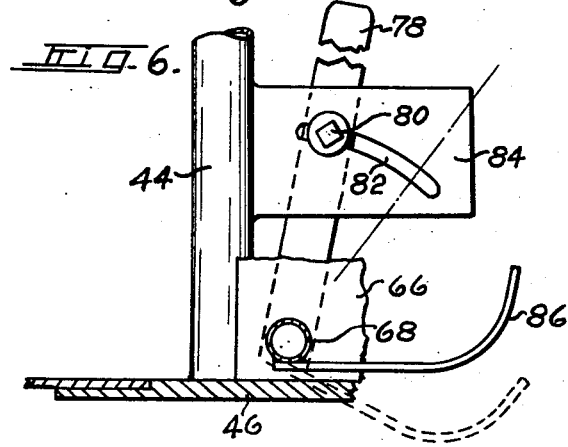
INVENTOR
WELLINGTON W. PORTER
BY
ATTORNEY

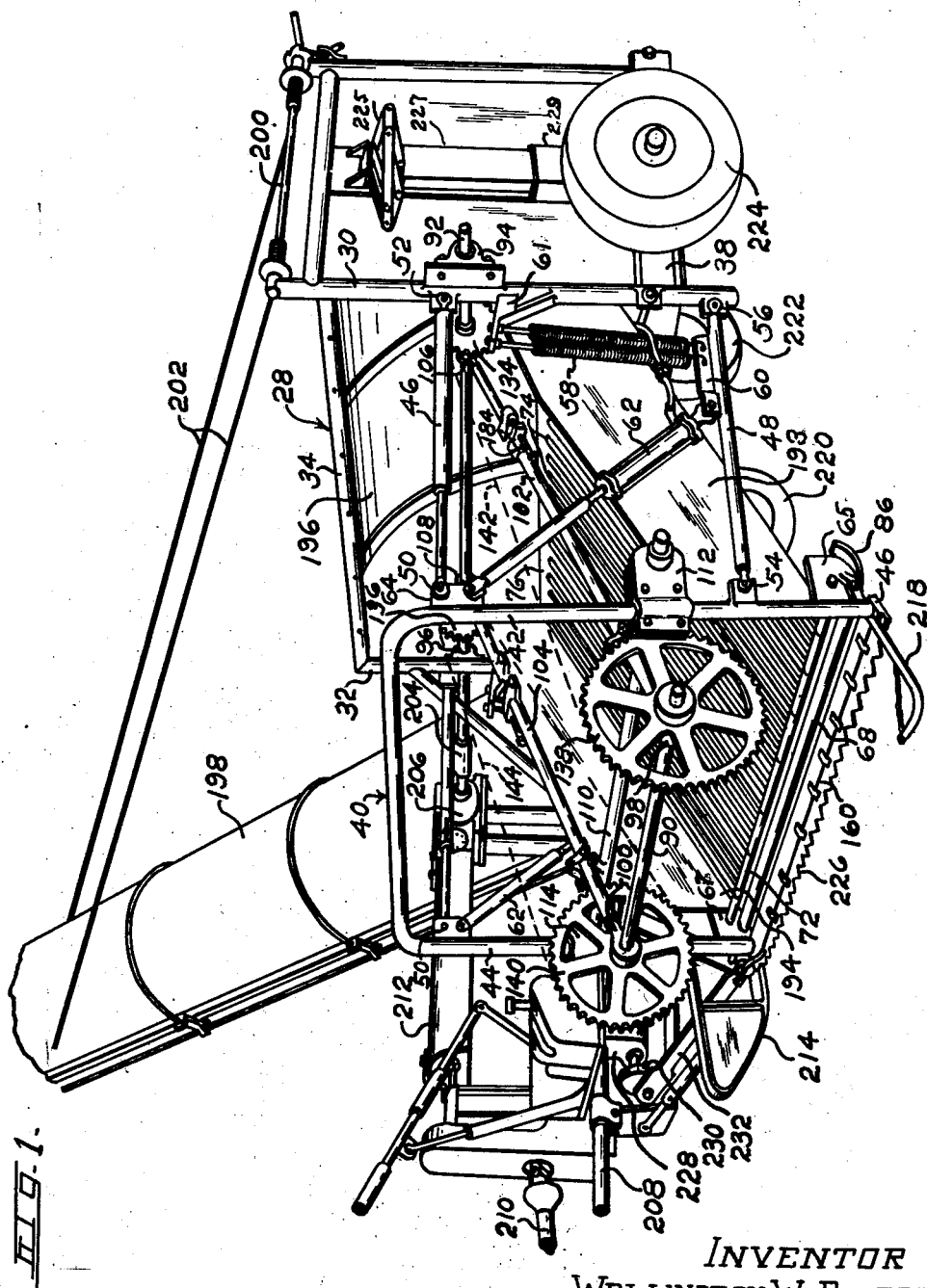

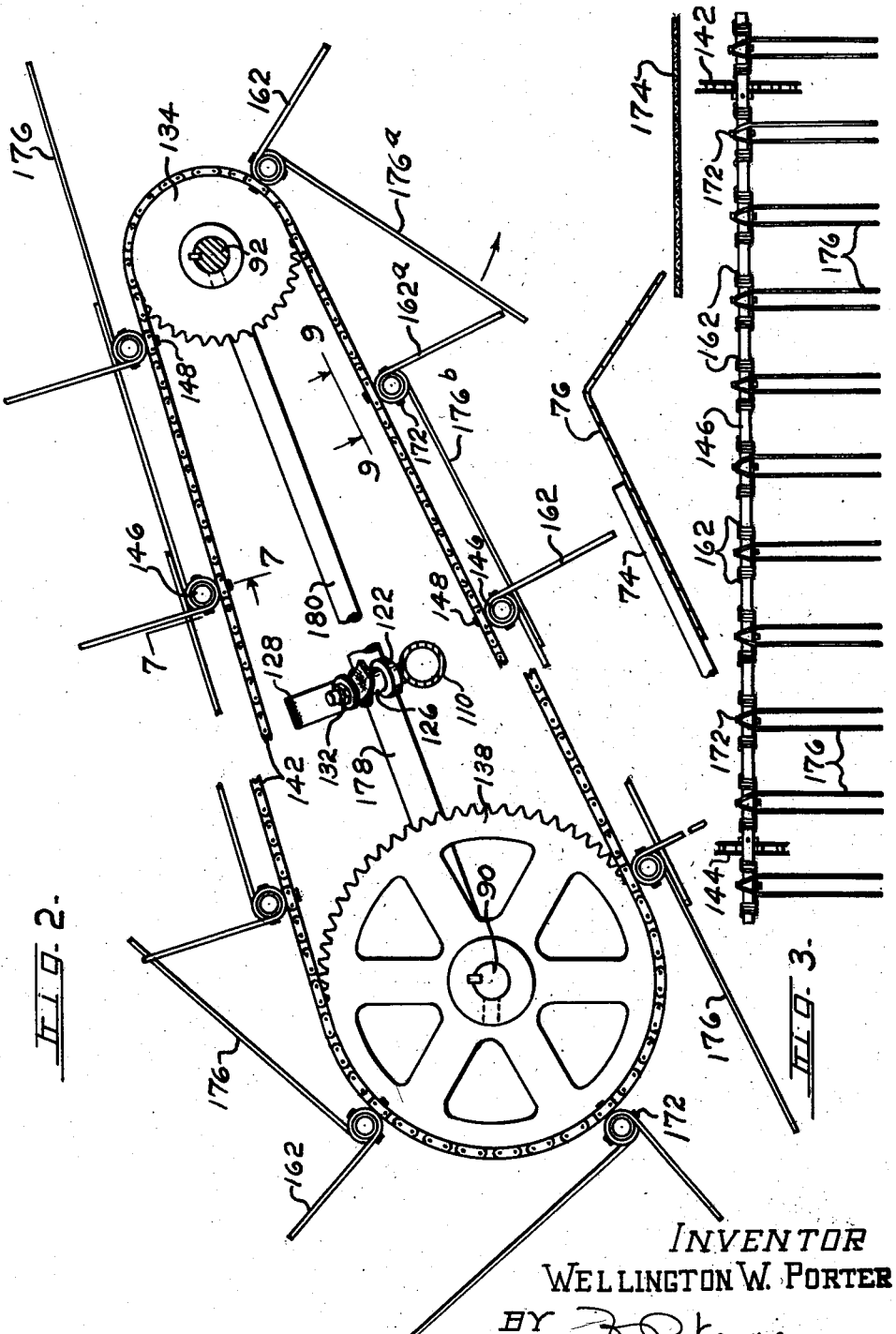

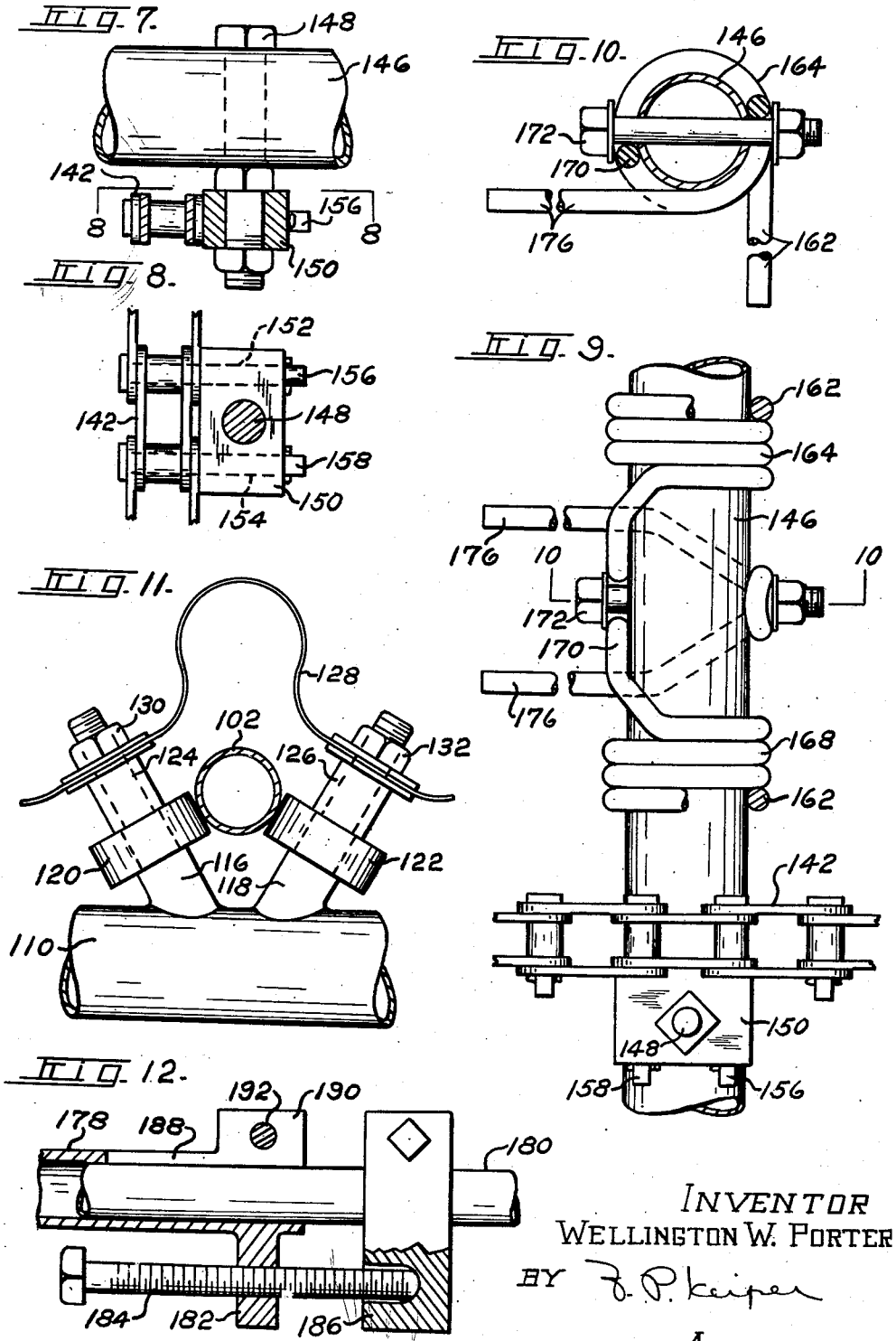

Patented Apr. 13, 1954

2,674,838

UNITED STATES PATENT OFFICE 2,674,838

ADJUSTABLE VINE HARVESTING DEVICE

Wellington W. Porter, Waterloo, N. Y.

Application July 25, 1950, Serial No. 175,761

13 Claims. (Cl. 56—177)

1

This invention relates to harvesters, and more particularly to feeding means adapted to cooperate with a ramp.

In copending applications Serial No. 623,134, filed October 18, 1945, and Serial No. 786,454, filed November 17, 1947, now Patents Nos. 2,524,007 and 2,614,379, respectively, there are shown harvester constructions having flexible ramps the forward edge of which, together with the gathering means, is adapted by reason of the flexibility to closely skirt the ground and compensate for irregularities whereby a maximum harvest is obtainable. Such apparatus also discloses feeding means of a flexible nature for delivering pea vines and the like up the ramp to a transverse conveyor and truck loading system.

The present invention relates particularly to an improvement in the feed means, there being provided an endless belt mechanism, the lower reach of which is adapted to feed material up the ramp. A feature of said feeding means is the incorporation of an automatically operative stripper mechanism functioning as a result of the wrap of the endless belt around the upper end supporting wheel for the endless belt. Further features have to do with the flexible nature of the endless belt construction, means for regulating cutter height, and in general, a combination of elements adapted to perform an efficient expeditious harvesting operation through rugged mechanism of a non-complex nature.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a perspective view of the harvester with the continuous chain mechanism indicated diagrammatically for clearness;

Figure 2 is an enlarged fragmentary side elevation of the chain mechanism for feeding vines and the like up the ramp;

Figure 3 is an enlarged top plan view of a transverse bar of the feed mechanism;

Figure 4 is an enlarged fragmentary plan view of the ramp of Figure 1;

Figure 5 is an enlarged fragmentary view in plan of the shoes for regulating cutter bar height above the ground;

2

Figure 6 is a transverse section taken substantially on the line 6—6 of Figure 5;

Figure 7 is an enlarged fragmentary view of the transverse bar chain mount, taken substantially on line 7—7 of Figure 2;

Figure 8 is a section taken substantially on the line 8—8 of Figure 7;

Figure 9 is an enlarged fragmentary view of the bar of Figure 3, showing the details of the chain mount, feed tines and stripping tines, taken substantially on the line 9—9 of Figure 2;

Figure 10 is a transverse section taken substantially on the line 10—10 of Figure 9;

Figure 11 is an enlarged fragmentary sectional view taken through a reach bar of Figure 1, showing its flexible roller support on a transverse frame member; and Figure 12 is a fragmentary detail shown partly in section, of the reach bar adjustment.

Referring to the drawings, and particularly Figure 1, there is shown the general arrangement of a harvester, similar in many respects to the improved structure disclosed particularly in the aforesaid copending application Serial No. 786,454, now Patent No. 2,614,379. The structure comprises an L frame, comprising a forward extending tongue to the left, and a transverse wheeled frame, having to the rear thereof a horizontal conveyor, with an elevating inclined conveyor for facilitating loading of trucks. Such frame has mounted forwardly thereof a flexible ramp preceded by a cutting bar.

The forward extending tongue is adapted to be coupled to a tractor, and supports transmission mechanism receiving power from the tractor for driving the cutter bar, ramp, feed mechanism and conveyors. The various features referred to are illustrated in perspective in Figure 1, for the purpose of illustrating the general arrangement.

More specifically, the rear transverse wheeled frame 28 comprises spaced uprights 30 and 32 tied together by a top transverse member 34 and an upper ramp supporting bar 36 (see Figure 4), the uprights being further tied together by the conveyor frame 38, extending across the rear frame. The structure of the rear frame may be varied but requires the uprights 30 and 32 suitably tied together and supported upon wheels for rolling over the ground at a relatively fixed height.

Forward of the rear frame is a second frame in the form of a broad yoke 40, having side members 42 and 44 extending downwardly to a transverse cutter bar supporting member 46. The forward frame is floatingly carried from the rear frame by means of pairs of side links, as 46 and 48, such links being joined to the forward and rearward frames by means of pivotal connections 50, 52, 54 and 56, affording universal movement. The weight of the forward frame 40 is counterbalanced by coil springs 58 arranged on either side, the springs being tensioned between rear frame supported brackets 61 and plates 60 secured to the lower side links 48. Diagonal fluid pressure actuated expansible links 62 connecting the plates 60 of the lower link to the upper link pivot plates 64 of the forward frame, afford power means for lifting or lowering the forward frame. The links 46 and 48 and expansible links 62 are all connected through swivel pivots, whereby the forward frame may warp or twist with respect to the rear frame as well as move up or down, all as described in the aforesaid patent.

The lower ends of the side members 42 and 44 are provided with rearwardly extending plates 65 and 67, which in turn support a ground shoe support member 68, and an elongated transverse bolt 70, upon which are loosely threaded a series of short sleeves 72 to which are attached tubular members 74 which extend rearwardly to an apron 76 supported on the rear frame member 36 to form the flexible ramp. The tubular members are spaced to permit stones and the like to drop through during passage up the ramp. The ground shoe support member is rotatable by means of a lever 78 which may be secured in any selected position by a lock bolt 80 passing through an arcuate slot 82 in a plate 84 attached to the forward frame upright 44. The ground shoe support member has a plurality of spaced shoes 86 trailing rearwardly from the member 68 and it will appear that by rocking the support member through the lever 78, such shoes may be elevated or lowered to regulate the height of the cutter above the ground.

In order to deliver pea vines or spinach and the like up the flexible ramp, there is provided thereabove an endless chain feeding mechanism supported on forward and rearwardly spaced shafts 90 and 92, the rear shaft 92 being journaled in bearings 94 and 96 mounted upon the uprights 30 and 32. The forward shaft 90 is journaled in self-aligning bearings 98 and 100 carried at the ends of adjustable struts or reach members 102 and 104 which are pivotally mounted at their rearward end upon self-aligning bearings 106 and 108 mounted on the shaft 92. The reach members 102 and 104 are flexibly supported upon a transverse bar 110 mounted upon brackets 112 and 114 carried on the uprights 42 and 44. The transverse bar is provided with V-members 116 and 118 upon which are mounted rollers 120 and 122, the latter engaging the wall of the reach members whereby upon warping of the ramp and the front frame relative to the rear frame, the reach bar is free to move. The V-members 116 and 118 are provided with spacer sleeves 124 and 126, and a flexible strap 128 bridging across the reach member is secured to the V-members 116 and 118 by the nuts 130 and 132. It will be appreciated that the flexible strap prevents the reach bar from being dislocated from its normal resting place, that is upon the rollers 120 and 122. It will be apparent that each of the reach bars 102 and 104 is provided with a similar construction employing rollers 120 and 122 supported on the bar 110.

The shaft 92, which may be considered as a drive shaft, and the shaft 90, which may be referred to as a driven or idler shaft, have positioned thereon spaced sprockets 134, 136, 138 and 140, respectively, around which are positioned two chains parallel with one another but spaced by the axial spacing between the sprockets. Such chains are diagrammatically indicated in Figure 1 by the dotted lines 142 and 144.

Each of the chains, as shown in Figure 2, passes around the small sprocket, for example 134, mounted on shaft 92, and the large sprocket 138 on the idler shaft 90, and are of the usual roller type. Interconnecting the two parallel chains are transverse bars 146, uniformly spaced around the length of the chain, and by reason of the sprockets 134 and 136 being keyed to the drive shaft 92, such bars are held in substantially parallel relation to one another and at right angles to the parallel chains which support them. The bars are secured at their respective ends to their respective chains by studs 148 extending into blocks 150 which are transversely bored as at 152 and 154 to receive extended roller chain pins 156 and 158. The flexibility of the chains and the clearances provided between the bores 152 and 154 and the pins 156 and 158 permit slight flexibility whereby, when the shaft 90 is warped with relation to the shaft 92, little or no strain is placed upon the chains. It will be observed that the lower reach of each of the chains 142 and 144 extends substantially parallel to but spaced from the ramp, the distance being sufficient to permit the travel up the ramp of a considerable thickness of pea vines, spinach or other vegetation being harvested.

In order to cause vines cut by the cutter 160 to travel up the ramp, each of the bars 146 is provided with a series of tines 162 extending transversely of the chain and downwardly toward the ramp. Such tines are formed of heavy resilient steel wire and in pairs, the tines being supported upon the bars 146 by coils 164 and 166 through which the bar is threaded, such coils being connected by a loop 170 adapted to embrace a stud 172 passing through the bar.

It will be understood that the tines 162 will be moved up the ramp in a manner such that vines or spinach or the like will be moved upwardly of the ramp, and that such tines will pass around the sprockets 134 and 138 in an endless manner so that upon delivering a batch, such tines will be returned to the starting point to engage a succeeding batch. Vines such as spinach and peas, however, are likely to become caught upon the tines, and not be discharged therefrom onto the conveyor belt 174 and travel around the endless chain, sooner or later resulting in building up a large mass of material which would interfere with the acceptance and delivery of freshly cut material up the ramp.

In order to keep the tines 162 clear or to enforce the removal from the tines of any vine material as such vine material reaches a position over the conveyor belt 174, rearwardly extending tines 176 are provided at suitably spaced intervals, the same also being mounted upon the transverse bars 146. Such rearwardly extending tines are of U-shape generally, providing rearwardly extending free ends. The yoke portion of the U may be of somewhat V-shape, and have a partial wrap around the bar 146 and be secured to the bar by the same bolt 172 which secures the tines 162 to the bar. It will appear that for convenience, there are as many pairs of rearwardly extending tines 176 as there are transversely extending tines 162, and that the spacing of such tines is such as to permit the rearwardly extending tines to cooperate such the succeeding set of transversely extending tines. The manner of cooperation whereby the rearwardly extending tines strip the transversely extending tines is illustrated in Figure 2, wherein it will appear that the rearwardly extending tines indicated at 176a have moved from a position such as indicated at 176b whereby the ends of the tines have moved along the length of the tines 162a, forceably stripping the tines 162a of any vines or growth being delivered up the ramp by the endless chain mechanism.

To maintain both chains in taut condition, each of the reach bars comprises a tubular member 178 and a telescoping member 180 which may slide relatively to one another to extend the distance between the axes of the shafts 92 and 90. To facilitate extending the reach bars, the tubular member 178 is provided with a threaded lug 182 through which an elongated adjustment bolt 184 extends parallel with the reach bar. Such adjustment bolt engages a suitably recessed block 186 clamped upon the member 180 so that by turning the bolt 184 in one direction or the other, the telescopic members 178 and 180 may be caused to move longitudinally with respect to each other. The tubular member 178 is split as at 188 and provided with clamp ears such as 190 and a transverse bolt 192 whereby, once adjustment is obtained, the tubular member 178 may be clamped tightly upon the member 180 to secure the parts in the set position.

The ramp is provided with side walls 193 and 194 which may for conveniennce be secured to the plates 64, 64, and such side walls may be flexibly supported upon the transverse member 36 or the apron 76 supported thereby associated with the rear frame and uprights 30 and 32 thereof.

The conveyor 174 may be conveniently housed by a suitably contoured shield 196, and the inclined conveyor 198 may be of the covered type and set at any angle by means of the winch 200 and cables 202, it being understood that the conveyor belt 174 will deliver the cuttings to the inclined conveyor 198 for delivery preferably to a truck which will accompany the harvester as it proceeds down the field.

The drive shaft 92 is connected by a universal coupling 204 of any desired type, and is driven from the miter gear box 206 which derives power from the tractor connected to the tongue 208 of the L frame previously referred to. The power connection to the tractor may be made through the usual universal drive shaft shown at 210, and the same drive the shaft 92 through the miter gear box and such other speed reducing mechanism as may be desirable and which is located above the tongue within the housing 212. The forward frame may be provided with groundengaging shoes 214 and 216, but its height above the ground will be regulated by the trailing ground-engaging shoes 86. The L frame may be supported on wheels such as 220 and 222 positioned beneath or rearwardly of the ramp described, and if desired, an outboard wheel 224 may be provided which may be adjustable in height by a parallelogram jack 225, acting upon a wheel support 227 extending through a guide 229, so that the wheel may roll in a deep furrow between adjacent crop rows.

It will be apparent that the ramp may be of sufficient width to accommodate a number of rows, if of spinach, for example, six rows having a spacing of approximately 10 inches, and that by reason of the flexibility of the mounting of the front frame 40 with respect to the rear frame, and the accurate height control by reason of the ground-engaging shoes 86, the cutter 160 may at all times skirt the ground at a height of a fraction of an inch, thereby resulting in efficient harvesting of low-lying crops.

While the illustration in Figure 1 is perspective and not particularly detailed as to the L frame including the wheel supports and tongue and transverse conveyor, reference will be had to the application above referred to for such details as is essential.

It will be understood that the cutter 160 may have a reciprocating cutter bar 226, as is usual, also driven by a power take-off 228 having a crank 230 and pitman 232, it being understood that the present invention is directed principally to an improvement in a flexible mechanism for delivering vines up a flexible ramp of the type described. An important feature thereof being the arrangement of the feeding tines and the stripping tines upon the endless chain mechanism in such a manner that the stripping tines will clear the feeding tines as soon as such feeding tines reach the region immediately above the transverse conveyor belt 174.

While a pair of spaced chains have been shown as the preferred form, it will appear that spaced belts, or a single belt for supporting the feed tines and stripper tines, or the equivalent thereof, may be used where width, length and other factors render such construction desirable. The feed tines and stripping tines, however, will utilize the curvature feature of the belt, to bring the stripper tines into action at the end of the endless belt, the stripper tines at this point assuming tangential relation to the end shaft and belt supporting wheel, whether a sprocket wheel or otherwise.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a harvester, an inclined ramp, a pair of parallel laterally spaced chains mounted upon forward and rear sprockets above said ramp, the lower reaches of said chains extending substantially parallel but spaced from said ramp, transverse bars carried by said chains in spaced substantially parallel relation, means for fixing said bars against rotation relative to said chains, feeding tines secured to said bars of a length substantially that of the spacing between said reaches and ramp and extending substantially perpendicularly thereto, and stripper tines secured to said bars and extending forwardly of said bars a distance greater than the spacing between adjacent bars, whereby upon the said chains passing around the curvature of said sprockets, said stripper tines extend tangentially with respect to said sprockets and move radially along adjacent said feed tines to strip said feed tines.

2. In a harvester, an inclined ramp, gathering means extending transversely substantially the width of the forward lower ramp end, a pair 2,674,838 of parallel laterally spaced chains mounted upon forward and rear sprockets above said ramp, the lower reaches of said chains extending substantially parallel but spaced from said ramp, transverse bars carried by said chains in spaced substantially parallel relation, means for fixing said bars against rotation relative to said chains, feeding tines secured to said bars of a length substantially that of the spacing between said reaches and ramp and extending substantially perpendicularly thereto, and stripper tines secured to said bars and extending forwardly of said bars a distance greater than the spacing between adjacent bars, whereby upon the said chains passing around the curvature of said sprockets said stripper tines extend tangentially with respect to said sprockets and move radially along adjacent said feed tines to strip said feed tines.

3. In a harvester, an inclined ramp, gathering means extending transversely substantially the with of the forward lower ramp end, a pair of parallel laterally spaced chains mounted upon forward and rear sprockets above said ramp, the lower reaches of said chains extending substantially parallel but spaced from said ramp, transverse bars carried by said chains in spaced substantially parallel relation, means for fixing said bars against rotation relative to said clains, outwardly extending feeding tines secured to each of said bars, and stripper tines secured to each of said bars and extending forwardly of said bars beyond the next adjacent bar.

4. In a harvester, an inclined ramp, a pair of parallel laterally spaced chains mounted upon forward and rear sprockets above said ramp, the lower reaches of said chains extending substantially parallel but spaced from said ramp, transverse bars carried by said chains in spaced substantially parallel relation, means for fixing said bars against rotation relative to said chains, outwardly extending feeding tines secured to each of said bars, and stripper tines secured to each of said bars and extending forwardly of said bars beyond the next adjacent bar, whereby upon the said chains passing around the curvature of said sprockets, said stripper tines move radially along said fed tines to strip said feed tines.

5. In a harvester, an inclined ramp, a forward frame therefor, a rear frame therefor, and links connecting said frames, forward and rear shafts supported by said frames, each having spaced sprockets thereon, a pair of parallel laterally spaced chains mounted upon said sprockets above said ramp, the lower reaches of said chains extending substantially parallel but spaced from said ramp, transverse bars carried by said chains in spaced substantially parallel relation, means for fixing said bars against rotation relative to said chains, outwardly extending feeding tines secured to said bars, and stripper tines secured to said bars and extending forwardly of said bars beyond the next adjacent bar, whereby said stripper tines position themselves tangentially in passing around said sprockets to strip said feed tines.

6. In a harvester, an inclined ramp, a pair of spaced shafts extending transversely of said ramp above the forward and rearward end thereof respectively, endless feed means supported by wheels on said shafts providing a reach thereof extending substantially parallel to and spaced above said ramp, outwardly extending feeding tines secured to said endless feed means in successive transverse rows, and stripper tines secured to said endless feed means extending forwardly from one row to a point beyond the next succeeding row, said stripper tines moving around said end wheels in tangential relation thereto to strip said feed tines.

7. In a harvester, an inclined ramp, endless chain means mounted above said ramp with the lower reach thereof extending substantially parallel with the ramp and spaced therefrom, feeding means mounted on said chain means adapted to reach substantially to said ramp, means for stripping said feeding means, mounted on said chain means in spaced relation therealong from said feeding means, and means for rendering said stripping means active to strip said feeding means in response to curvature of said chain means at the end of the travel of said parallel reach.

8. In a harvester, a rearward frame, supporting wheels therefor, a forward frame, flexible support means extending forward from said rear frame and connected to said forward frame, a warpable ramp secured to one of said frames and extending upward in inclined relation from said forward frame to said rearward frame, a drive shaft journaled on the rear frame, reach bars extending from said drive shaft forward thereof and flexibly supported on said forward frame, a shaft carried by said reach bars, spaced sprockets on each of said shafts, parallel chains connecting said sprockets on said respective shafts, transverse bars carried by said chains in equally spaced parallel relation, means for fixing said bars against rotation relative to said chains, the lower reaches of said chains being substantially parallel to said ramp and spaced therefrom, means carried by said bars for feeding material up said ramp, and means carried by said bars and acting in response to curvature of said chains about the drive shaft sprockets for stripping said feeding means.

9. In a harvester, a main transverse frame, ground wheels, a forward frame, substantially parallelogram linkages having universal connections to said frames at opposite ends, for affording relative movement between the frames, the forward frame thereby having substantially vertical and warping movement relative to the main frame, a warpable ramp having its forward lower end carried by said forward frame, and its rearward upper end carried by said main frame, plant gathering means carried by said forward frame extending substantially the width of the ramp lower edge, warpable endless feed means located above the ramp for moving gathered plants along and up the ramp, and stripping means carried by said feed means.

10. In a harvester, a main transverse frame, ground wheels, a forward frame, substantially parallelogram linkages having universal connections to said frames at opposite ends, for affording relative movement between the frames, the forward frame thereby having substantially vertical and warping movement relative to the main frame, a warpable ramp having its forward lower end carried by said forward frame, and its rearward upper end carried by said main frame, plant gathering means carried by said forward frame extending substantially the width of the ramp lower edge, warpable endless feed means located above the ramp for moving gathered plants along and up the ramp, spaced shafts and wheels supporting an endless belt feeding means above said ramp, for feeding material up said ramp, and stripping means carried by said feeding means.

11. In a harvester, a frame comprising a rearward transverse member, and a forward transverse member, flexible support means extending forward from said rear frame and connected to said forward frame, a warpable ramp having its lower forward end carried by said flexibly supported member, gathering means extending transversely substantially the width of the forward ramp end and carried by said last-named member, and means warpable with the ramp and located above the ramp for moving vines and the like up the ramp, said last-named means comprising an endless belt feeding means warpable with said ramp.

12. In a harvester, a frame comprising a rearward transverse member, and a forward transverse member, flexible support means extending forward from said rear frame and connected to said forward frame, a warpable ramp having its lower forward end carried by said flexibly supported member, gathering means extending transversely substantially the width of the forward ramp end and carried by said last-named member, means warpable with the ramp and located above the ramp for moving vines and the like up the ramp, said last-named means comprising an endless belt feeding means warpable with said ramp, the lower reach thereof having outwardly extending tines, and stripper tines, the latter secured at one end to said belt and lying along the lower reach of said belt means, and having free ends adjacent said first-named tines.

13. In a harvester, a frame comprising a rearward transverse member, and a forward transverse member, flexible support means extending forward from said rear frame and connected to said forward frame, a warpable ramp having its lower forward end carried by said flexibly supported member, a cutter carried by said last-named member, ground-engaging means trailing said cutter across the width thereof for fixing the cutter height, and warpable endless belt feed means supported by said members, having a feeding reach above and substantially uniformly spaced from said ramp.

References Cited in the file of this patent

UNITED STATES PATENTS

| Number | Name | Date |
|---|---|---|
| 1,521,089 | Glasener | Dec. 30, 1924 |
| 1,724,300 | Moncreiffe | Aug. 13, 1929 |
| 2,167,980 | Lloyd-Jones | Aug. 1, 1939 |
| 2,288,238 | Goodall | June 30, 1942 |
| 2,302,881 | Oehler | Nov. 24, 1942 |
| 2,347,926 | Paradise | May 2, 1944 |
| 2,414,823 | Luebben | Jan. 28, 1947 |
| 2,510,704 | Locke | June 6, 1950 |
| 2,585,891 | Worsdell | Feb. 12, 1952 |